E. F. TOWNSEND.
TRACTOR.
APPLICATION FILED NOV. 9, 1918.
1,296,022. Patented Mar. 4, 1919.
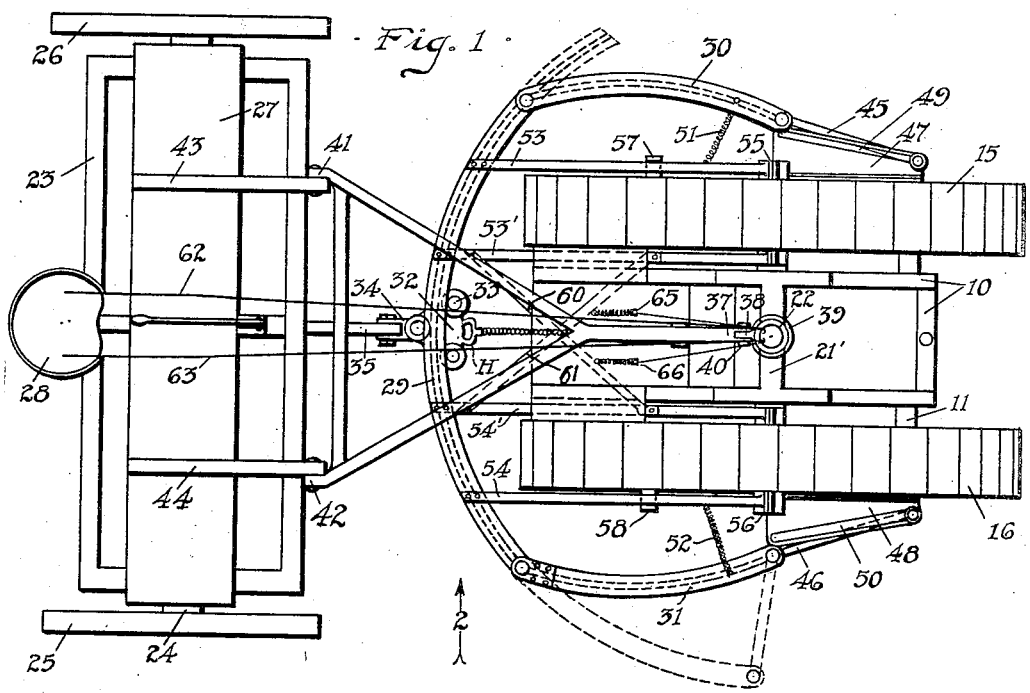

UNITED STATES PATENT OFFICE.

ERNEST F. TOWNSEND, OF SAN FRANCISCO, CALIFORNIA, ASSIGNOR TO LUCRETIA A. TOWNSEND, OF SAN FRANCISCO, CALIFORNIA.

TRACTOR.

1,296,022.  Specification of Letters Patent.  Patented Mar. 4, 1919.

Application filed November 9, 1918. Serial No. 261,875.

*To all whom it may concern:*

Be it known that I, ERNEST F. TOWNSEND, a citizen of the United States, residing at San Francisco, in the county of San Francisco and State of California, have invented new and useful Improvements in Tractors, of which the following is a specification.

My invention relates to a drawbar attachment for use in connecting a trailer to a tractor.

An object of my invention is to provide a drawbar attachment between a trailer or farming implement and a tractor in which the connections are made so close to the ground that instead of the usual upward pull on the front end of the tractor there will be a downward pull which will cause increased friction between the tractor treads and the ground, and thus will increase the efficiency of the tractor.

Another object is to provide a drawbar attachment between a trailer or farming implement and a tractor which will permit of short turns being made.

With these and other objects in view, my invention consists in the construction, combination and arrangement of parts hereinafter described and claimed.

In the accompanying drawings which form a part of this specification,

Figure 1 is a top plan view of a tractor connected to a seeder by means of a drawbar attachment embodying the principles of my invention.

Fig. 2 is a view in side elevation of the seeder and tractor shown in Fig. 1, looking in the direction indicated by arrow 2 in Fig. 1.

The tractor shown in Fig. 1 is of a type having a frame 10 mounted upon dead axles 11 and 12 upon which rear sprockets 13 and front sprockets 14 turn. Tractor treads 15 and 16 extend around a front and rear sprocket on each side of the tractor. The tractor is driven by an engine 17 mounted on the tractor framework acting through stub shafts 18 equipped with pinions 19 which mesh with internal gears formed on the rear sprockets. Reaches 20 are connected to the outer ends of the axles outside and inside of the sprockets and a vertical frame 21 having a cross yoke 21' with a central tubular bearing 22 is fixed to the tractor framework at its longitudinal center.

The seeder is of the ordinary type used by farmers and consists of a frame 23 supported on an axle 24 upon which wheels 25 and 26 are mounted. A seed box 27 is mounted over the axle and a seat 28 is attached to the frame.

The drawbar attachment comprises an arcuate transverse rail 29 extending around the rear end of the tractor, arcuate extension rails 30 and 31 pivotally connected to its ends, and a roller head 32 equipped with rollers 33 adapted to bear against the front and rear faces of the transverse rail 29 and extension rails 30 and 31, said roller head being equipped with a rearwardly extending split lug 34 adapted to pivotally connect with the forward end of the seeder drawbar 35. An auxiliary attaching bar in form of a triangular link member 36 has its forward end 37 split to receive a lug 38 formed on a swivel ring 39 which is adapted to turn on the bearing 22 of the cross yoke 21'. A pivot pin 40 connects the lug 38 to the split end 37 of the link member. The sides of the link diverge rearwardly and terminate in lugs 41 and 42 which are pivotally connected to the forward ends of cross-bars 43 and 44 fixed to the seed box of the seeder.

The forward ends of the extension rails 30 and 31 are pivotally connected to supporting rods 45 and 46 and the forward ends of these supporting rods are pivotally connected to side plates 47 and 48 which are fixed to the reaches 20 on the sides of the tractor. The pivot pins in the forward ends of the supporting rods are adapted to slide in slots 49 and 50 formed in the side plates. Retractile coil springs 51 and 52 having one end fixed in the reaches 20 extend outwardly and have their outer ends fixed to the extension rails 30 and 31 near their forward ends. These springs act to hold the extension rails inwardly against the sides of the tractor. The fixed rail section 29 is supported by two pairs of parallel connecting bars 53 and 53' on one side, and 54 and 54' on the other. These bars have their rear ends attached to the fixed rail 29 and their forward ends pivotally connected to horizontal stub shafts 55 and 56 fixed to the reaches 20, so that they extend transversely between the front and rear sprockets 13 and 14. The reaches are so formed as to provide for mounting the stub shafts 55 and 56 and the side plates 47 and 48 well below the line of centers of the tractor sprockets 13 and 14, so that the pulling force between the tractor and the trailer has a downward component which pulls the front end of the tractor downward and consequently holds the tractor treads in close contact with the ground throughout their length.

Vertical supporting hooks 57 and 58 adapted to hook under supporting bars 53 and 54 are fixed to the rear ends of the outer reaches 20. A stay chain 59 has one end attached to the roller head 32 and the other to the under side of link member 36. The purpose of the hooks and stay chain is to hold the transverse rail 29 and roller head 32 from dragging on the ground, and at the same time to allow them a certain amount of vertical motion. Cross braces 60 and 61, attached to the inner connecting bars 53' and 54', prevent lateral racking of the connecting rail rigging. Controlling lines 62 and 63 extend from the driver's seat through a sector plate 64 fixed on link member 36 and through the tubular bearing 22 to control levers 65 and 66 of the engine.

Operation: The seeder being connected to the tractor as illustrated in the drawings, it is evident that when a turn is made the upper connections which include the link member 36 will turn on the tubular bearing 22 of the tractor while the draw-bar connections move along the arcuate rail 29 as it is pulled through the roller head 32. The link connections are made so high on the tractor that the link member 36 easily clears its framework and treads, and the drawbar connections are so far back of the treads that the roller head 32 can travel the entire length of the connecting rail without interference. The tractor can therefore turn on its center at right angles to the trailer and thus make an exceptionally short turn. When this is done the roller head 32 acts to pull the extension rail 31 outwardly into arcuate alinement with the fixed section of the connecting rail on the side to which the tractor is turned. As the extension rail is pulled outwardly the supporting rod 46 is pulled backwardly in the slot 50 of the side plate 48 into the position shown in dotted lines in the lower part of Fig. 1. When the trailer turns into alinement with the tractor, the roller head 32 travels back to its middle position and the extension rail 31 is pulled inwardly toward the side of the tractor, the forward end of the supporting bar 46 moving forwardly in the slot 50 to its normal position.

The two great advantages of my drawbar attachment are the exceptionally short turns made possible by it and the exceptional tractive force effected by the downward pull on the front end of the tractor, due to the low connecting point of the drawbar attachment, and the consequent great friction between the tractor treads and the ground.

While I have shown the preferred construction of my drawbar attachment, as now know to me, it will be understood that various changes in construction, combination and arrangement of parts may be made by those skilled in the art without departing from the spirit of my invention as claimed.

I claim:

1. A drawbar attachment for use in connection with a tractor and a trailer comprising an arcuate connecting rail adapted to be attached to the rear end of a tractor, a drawbar head slidably attached to said arcuate connecting rail, said drawbar head being adapted to connect to a trailer drawbar, and a link member adapted to pivotally connect to a trailer at one end and to a tractor at the other.

2. A drawbar attachment for use in connection with a tractor and a trailer comprising an arcuate connecting rail adapted to be attached to a tractor, a roller head slidably mounted on said arcuate connecting rail, said roller head being adapted to be pivotally attached to the drawbar of a trailer, and a link member having its rear end adapted to be pivotally connected to a trailer and its forward end adapted to be pivotally connected to a tractor.

3. A drawbar attachment for use in connection with a tractor and a trailer comprising an arcuate connecting rail which includes a middle section provided with connecting bars adapted to be pivotally attached to a tractor and two side sections one end of which are pivotally attached to the ends of said middle section so as to swing outwardly into arcuate alinement with said middle section and inwardly toward the sides of the tractor; means for yieldingly holding said side sections against the sides of the tractor; a roller head slidably mounted on said arcuate connecting rail, said roller head being adapted to be pivotally connected to the drawbar of trailer; and a link member having its rear end adapted to be pivotally connected to trailer and its front end adapted to be pivotally connected to a tractor.

4. The combination with a tractor and trailer of a drawbar attachment comprising an arcuate connecting rail attached to t tractor so as to extend around its rear en a drawbar head slidably mounted on sa arcuate connecting rail, said drawbar he being pivotally attached to said trailer, a a link member pivotally attached to sa tractor and said trailer so as to coöper with said connecting rail and drawbar he 5. The combination with a tractor and trailer provided with a drawbar, of a dra bar attachment comprising an arcuate connecting rail attached to said tractor so as to extend around its rear end, a roller head slidably mounted on said arcuate connecting rail and pivotally attached to the drawbar of said trailer, and a link member pivotally connected to said tractor and said trailer so as to coöperate with said connecting rail and roller head.

6. The combination with a tractor and a trailer provided with a drawbar, of a drawbar attachment comprising an arcuate connecting rail extending around the rear end of the tractor, connecting bars having their rear ends fixedly attached to said connecting rail and their front ends pivotally attached to said tractor between its front and rear wheels and below their line of centers, a roller head slidably mounted on said arcuate connecting rail, said roller head being pivotally attached to the drawbar of said trailer, and a link member having its rear end pivotally attached to said trailer and its forward end pivotally attached to said tractor so as to coöperate with said connecting rail and roller head.

In testimony whereof I have signed my name to this specification.

ERNEST F. TOWNSEND.